(12) United States Patent
Myong et al.

(10) Patent No.: US 8,442,167 B2
(45) Date of Patent: May 14, 2013

(54) MULTISTAGE CHANNEL ESTIMATION METHOD AND APPARATUS

(75) Inventors: Seung Il Myong, Daejeon (KR); Hoe-Sung Yang, Daejeon (KR); Dong-Beom Shin, Daejeon (KR); Nak Seon Seong, Daejeon (KR); Heyung Sub Lee, Daejeon (KR); Cheol Sig Pyo, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 329 days.

(21) Appl. No.: 12/746,431

(22) PCT Filed: Jul. 29, 2008

(86) PCT No.: PCT/KR2008/004403
§ 371 (c)(1),
(2), (4) Date: Jun. 4, 2010

(87) PCT Pub. No.: WO2009/072724
PCT Pub. Date: Jun. 11, 2009

(65) Prior Publication Data
US 2010/0278289 A1    Nov. 4, 2010

(30) Foreign Application Priority Data
Dec. 4, 2007  (KR) .................. 10-2007-0124717

(51) Int. Cl.
*H04B 1/10*    (2006.01)
(52) U.S. Cl.
USPC ............................ 375/346; 375/316; 375/285

(58) Field of Classification Search .................. 375/316, 375/285
See application file for complete search history.

(56) References Cited

U.S. PATENT DOCUMENTS

| | | | |
|---|---|---|---|
| 6,470,030 B1 * | 10/2002 | Park et al. ..................... | 370/480 |
| 6,940,914 B1 * | 9/2005 | Lo et al. ........................ | 375/260 |
| 2003/0128751 A1 * | 7/2003 | Vandenameele-Lepla ... | 375/229 |
| 2003/0152170 A1 * | 8/2003 | Yousef .......................... | 375/340 |
| 2007/0217533 A1 * | 9/2007 | Hwang et al. ................. | 375/260 |
| 2007/0237069 A1 | 10/2007 | Chang et al. | |
| 2009/0022239 A1 * | 1/2009 | Kimura et al. ................ | 375/267 |

FOREIGN PATENT DOCUMENTS

| | | |
|---|---|---|
| KR | 1020030030739 | 4/2003 |
| KR | 1020040053412 | 6/2004 |
| KR | 1020050119592 | 12/2005 |
| KR | 1020070090800 | 9/2007 |

* cited by examiner

Primary Examiner — Siu Lee
(74) Attorney, Agent, or Firm — Nelson Mullins Riley & Scarborough LLP; EuiHoon Lee, Esq.

(57) ABSTRACT

A multistage channel estimation method and apparatus is provided. The multistage channel estimation method includes: receiving a data frame to compensate for a distortion of the data frame based on a first channel estimation value associated with a corresponding section of the data frame; a first step of changing the corresponding section to calculate a second channel estimation value associated with the changed section; a second step of updating the first channel estimation value based on the calculated second channel estimation value; a third step of compensating for the distortion of the data frame based on the updated first channel estimation value to count a number of compensations; and repeating the first step through the third step, when the counted number of compensations does not match a predetermined numerical value.

10 Claims, 4 Drawing Sheets

MULTISTAGE CHANNEL ESTIMATION METHOD AND APPARATUS

RELATED APPLICATIONS

This application is a 35 U.S.C. §371 national stage filing of PCT Application No. PCT/KR2008/004403 filed on Jul. 29, 2008, which claims priority to, and the benefit of, Korean Patent Application No. 10-2007-0124717 filed on Dec. 4, 2007. The contents of the aforementioned applications are hereby incorporated by reference.

TECHNICAL FIELD

The present invention relates to a Radio Frequency Identification (RFID) reader, and more particularly, to a channel estimation method and apparatus of an RFID reader according to ISO/IEC 24730-2 or 18185-5 type B.

This work was supported by the IT R&D program of MIC/IITA. [2006-S-023-02, Development of Advanced RFID System Technology]

BACKGROUND ART

A wireless transmission frame disclosed in ISO/IEC 24730-2 or 18185-5 type B includes a preamble section and a payload section. Generally, the preamble section is used for initial synchronization of a receiver and the payload section includes information to be transmitted.

When the wireless transmission frame is applied, channel estimation may be performed in the preamble section before the payload starts, which enables stable data determining of the payload. However, when obtaining a frequency to be used for the channel estimation, it is difficult to obtain a frequency near to a transmission frequency as the preamble section is shorter.

Accordingly, there is a need for a channel estimation technology that can stably obtain a transmission frequency and estimate a channel even in a short preamble structure.

DISCLOSURE OF INVENTION

Technical Problem

An aspect of the present invention provides a multistage channel estimation method and apparatus that can use a multistage channel estimation scheme of automatically estimating a distorted signal of a frequency and phase for each section along a distribution channel in a process of receiving a signal transmitted via a wireless channel, that is, a data frame and thereby can stably obtain and estimate a frequency of the data frame.

Another aspect of the present invention also provides a multistage channel estimation method and apparatus that can stably obtain and estimate a frequency of a data frame and thereby can more accurately restore the data frame.

The present invention is not limited to the above purposes and other purposes not described herein will be apparent to those of skill in the art from the following description.

Technical Solution

According to an aspect of the present invention, there is provided a multistage channel estimation method including: receiving a data frame to compensate for a distortion of the data frame based on a first channel estimation value associated with a corresponding section of the data frame; a first step of changing the corresponding section to calculate a second channel estimation value associated with the changed section; a second step of updating the first channel estimation value based on the calculated second channel estimation value; a third step of compensating for the distortion of the data frame based on the updated first channel estimation value to count a number of compensations; and repeating the first step through the third step, when the counted number of compensations does not match a predetermined numerical value.

The second step may include: summing up the first channel estimation value and the second channel estimation value to calculate a third channel estimation value; and correcting the calculated third channel estimation value to update the first channel estimation value.

The updating of the first channel estimation value may include: correcting the calculated third channel estimation value; and updating the corrected third channel estimation value with the first channel estimation value.

The compensating for the distortion may include: obtaining information associated with a frequency and phase of the data frame before passing through a channel; measuring a frequency and phase associated with a preamble section of the data stream as the corresponding section; comparing the obtained frequency and phase with the measured frequency and phase; calculating the first channel estimation value of the preamble section based on the comparison result; and compensating for the distortion of the data frame based on the calculated first channel estimation value.

The third step may include: compensating for a distortion of the measured frequency and phase associated with the preamble section based on the updated first channel estimation value; and compensating for a distortion of a frequency associated with a payload of the data frame based on the updated first channel estimation value.

The changed section may include any one of at least one bit unit in the data frame, a preamble, and a payload.

According to another aspect of the present invention, there is provided a multistage channel estimation method including: receiving a data frame to calculate first channel estimation values associated with each corresponding section of the data frame; calculating a second channel estimation value based on the calculated first channel estimation values; and compensating for a distortion of the data frame based on the calculated second channel estimation value.

The calculating of the second channel estimation value may include summing up and correcting the calculated first channel estimation values to calculate the second channel estimation value.

According to still another aspect of the present invention, there is provided a multistage channel estimation apparatus including: a receiver to receive a data frame; a channel estimator to calculate a first channel estimation value associated with a corresponding section of the data frame, change the corresponding section, calculate a second channel estimation value associated with the changed section, and update the first channel estimation value based on the calculated second channel estimation value; and a compensator to compensate for the distortion of the data frame based on the first channel estimation value, and to count a number of compensations, wherein, when the counted number of compensations does not match a predetermined numerical value, the channel estimator and the compensator repeat the above operation until the counted number of compensations reaches the predetermined numerical value.

The channel estimator may sum up the first channel estimation value and the calculated second channel estimation value to calculate a third channel estimation value, and correct the calculated third channel estimation value to update the first channel estimation value.

The channel estimator may correct the calculated third channel estimation value, and update the corrected third channel estimation value with the first channel estimation value.

The channel estimator may obtain information associated with a frequency and phase of the data frame before passing through a channel, measure a frequency and phase associated with a preamble section of the data stream as the corresponding section, compare the obtained frequency and phase with the measured frequency and phase, and calculate the first channel estimation value of the preamble section based on the comparison result. The compensator may compensate for the distortion of the data frame based on the calculated first channel estimation value.

The compensator may compensate for a distortion of the measured frequency and the phase associated with the preamble section based on the updated first channel estimation value, and compensate for a distortion of a frequency associated with a payload of the data frame based on the updated first channel estimation value.

The changed section may include any one of at least one bit unit in the data frame, a preamble, and a payload.

According to yet another aspect of the present invention, there is provided a multistage channel estimation apparatus including: a receiver to receive a data frame; a channel estimator to calculate first channel estimation values associated with each corresponding section of the data frame, and to calculate a second channel estimation value based on the calculated first channel estimation values; and a compensator to compensate for a distortion of the data frame based on the calculated second channel estimation value.

The channel estimator may sum up and correct the calculated first channel estimation values to calculate the second channel estimation value.

Additional aspects, features, and/or advantages of the invention will be set forth in part in the description which follows and, in part, will be apparent from the description, or may be learned by practice of the invention.

MODE FOR THE INVENTION

Figure 1:
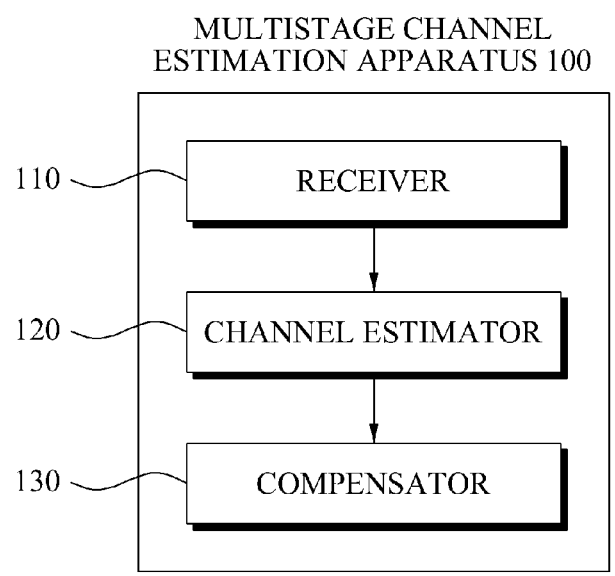
FIG. 1 is a block diagram illustrating a multistage channel estimation apparatus according to an embodiment of the present invention.

Reference will now be made in detail to embodiments of the present invention, examples of which are illustrated in the accompanying drawings, wherein like reference numerals refer to the like elements throughout. The embodiments are described below in order to explain the present invention by referring to the figures.

FIG. 1 is a block diagram illustrating a multistage channel estimation apparatus 100 according to an embodiment of the present invention. The multistage channel estimation apparatus 100 may be provided in a Radio Frequency Identification (RFID) reader.

Referring to FIG. 1, the multistage channel estimation apparatus 100 may include a receiver 110, a channel estimator 120, and a compensator 130.

The receiver 110 may receive a data frame from a predetermined communication apparatus, for example, an RFID tag, of a wireless communication system.

The channel estimator 120 may perform channel estimation for a corresponding section of the data frame. The channel estimator 120 may calculate a first channel estimation value associated with the corresponding section of the data frame.

Specifically, the channel estimator 120 may obtain information associated with a frequency and phase of the data frame before passing through a channel and measure a frequency and phase associated with a preamble section of the data stream. The channel estimator 120 may compare the obtained frequency and phase with the measured frequency and phase, and calculate the first channel estimation value of the preamble section based on the comparison result.

Accordingly, the compensator 130 may compensate for a distortion of the data frame based on the calculated first channel estimation value. Specifically, the compensator 130 may accurately restore the data frame by compensating for the distortion of the data frame based on the calculated first channel estimation value.

Also, the channel estimator 120 may change the corresponding section and perform channel estimation for the changed section. The channel estimator 120 may calculate a second channel estimation value associated with the changed section and update the first channel estimation value based on the calculated second channel estimation value.

The channel estimator 120 may sum up the first channel estimation value and the calculated second channel estimation value, calculate a third channel estimation value, and correct the calculated third channel estimation value through averaging of the values. The channel estimator 120 may update the corrected third channel estimation value with the first channel estimation value.

The changed section may include any one of at least one bit unit in the data frame, a preamble, and a payload.

The compensator 130 may compensate for the distortion of the data frame based on the first channel estimation value and count a number of compensations. The compensator 130 may compensate for a distortion of the measured frequency and phase associated with the preamble section based on the updated first channel estimation value. Also, the compensator 130 may compensate for a distortion of a frequency associated with a payload of the data frame based on the updated first channel estimation value. The compensator 130 may count the number of compensations associated with the data frame that includes the preamble and the payload. The first channel estimation value may include the updated first channel estimation value.

When the counted number of compensations does not match a predetermined numerical value, the channel estimator 120 and the compensator 130 may repeat the above operation until the counted number of compensations reaches the predetermined numerical value.

According to another aspect of the present invention, the channel estimator 120 and the compensator 130 may perform the following operations.

The channel estimator 120 may calculate first channel estimation values associated with each corresponding section of the data frame and calculate a second channel estimation value based on the calculated first channel estimation values. The channel estimator 120 may sum up and correct the calculated first channel estimation values to calculate the second channel estimation value. Specifically, the channel estimator 120 may calculate the second estimation channel value by summing up and correcting the calculated first channel estimation values through averaging of the first channel estimation values.

The compensator 130 may compensate for a distortion of the data frame based on the calculated second channel estimation value. The compensator 130 may compensate for the distortion of the data frame based on the calculated second channel estimation value to thereby more accurately restore the data frame.

Figure 2:
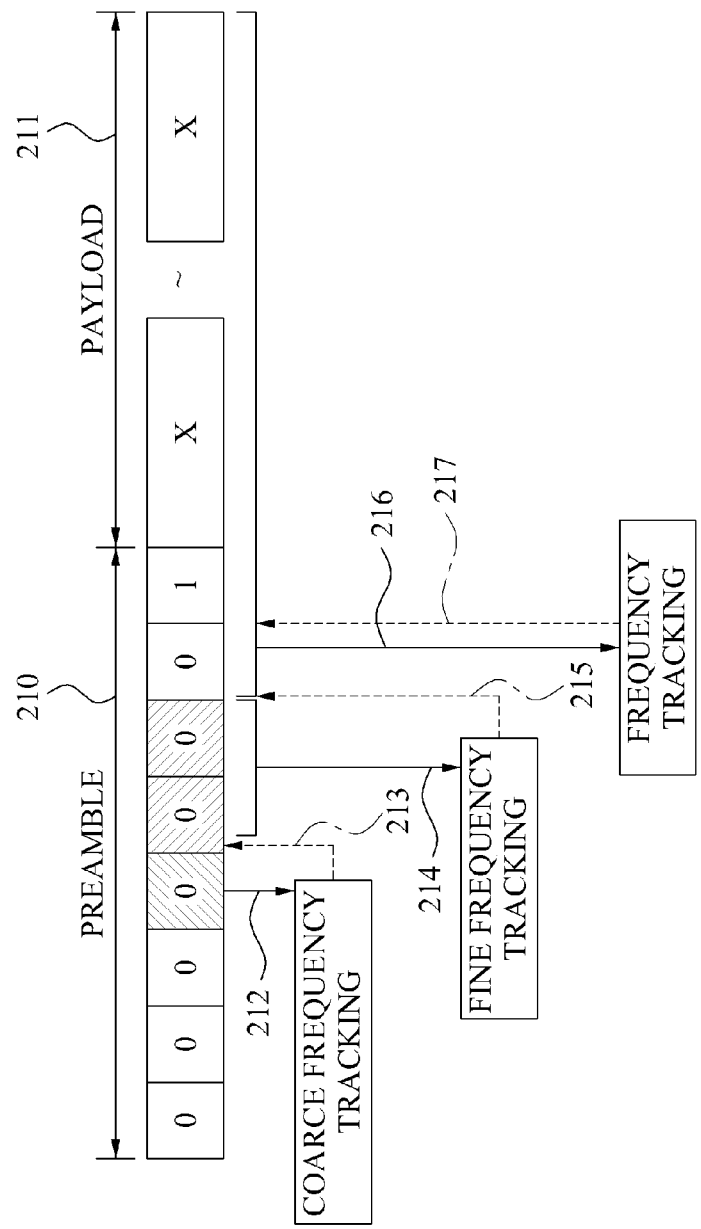
FIG. 2 illustrates an example of performing channel estimation for a data frame according to an embodiment of the present invention.

FIG. 2 illustrates an example of performing channel estimation for a data frame according to an embodiment of the present invention.

Referring to FIGS. 1 and 2, the data frame includes a preamble section 210 and a payload section 211. Hereinafter, the channel estimation for the preamble section 210 will be described.

In operations 212 and 213, the channel estimator 120 may perform channel estimation during a single bit section of the preamble section 210 to thereby calculate a first channel estimation value associated with a wireless channel. In order to compensate for a difference between a frequency offset and a phase obtained through the channel estimation, the channel estimator 120 may correct the difference between the frequency and phase via an automatic frequency controller and a digital-to-analog (A/D) converter. The compensator 130 may firstly compensate for a distortion of the data frame by controlling a frequency adjusting device and the like such as a variable crystal oscillator, based on the corrected value.

With maintaining the first channel estimation value as is, the channel estimator 120 may perform channel estimation during a subsequent 2-bit section of the preamble section 210 to thereby calculate a second channel estimation value in operations 214 and 215. In order to correct the difference between the frequency offset and phase obtained through the channel estimation, the channel estimator 120 may correct the difference between the frequency and phase via the automatic frequency controller and the A/D converter. The channel estimator 120 may sum up the first channel estimation value and the second channel estimation value, and correct the result of the summation. The compensator 130 may secondarily compensate for the distortion of the data frame by controlling the frequency adjusting device and the like such as the variable crystal oscillator, based on the corrected value.

With maintaining the first channel estimation value and the second channel estimation value as is, the channel estimator 120 may perform channel estimation during a subsequent single bit section of the preamble section 210 to thereby calculate a third channel estimation value in operation 216 and 217. In order to correct the difference between the frequency offset and phase obtained through the channel estimation, the channel estimator 120 may correct the difference between the frequency and phase via the automatic frequency controller and the A/D converter.

The channel estimator 120 may sum up the third channel estimation value and the first and the second channel estimation values, and correct the result of the summation. The compensator 130 may finally compensate for the distortion of the data frame by controlling the frequency adjusting device and the like such as the variable crystal oscillator, based on the corrected value.

As described above, according to an aspect of the present invention, a multistage channel estimation scheme of automatically estimating a distorted signal of a frequency and phase for each section along a distribution channel may be used for a process of receiving a data frame via a wireless channel. Accordingly, it is possible to stably obtain and estimate a frequency of the data frame and to more accurately restore the data frame.

Figure 3:
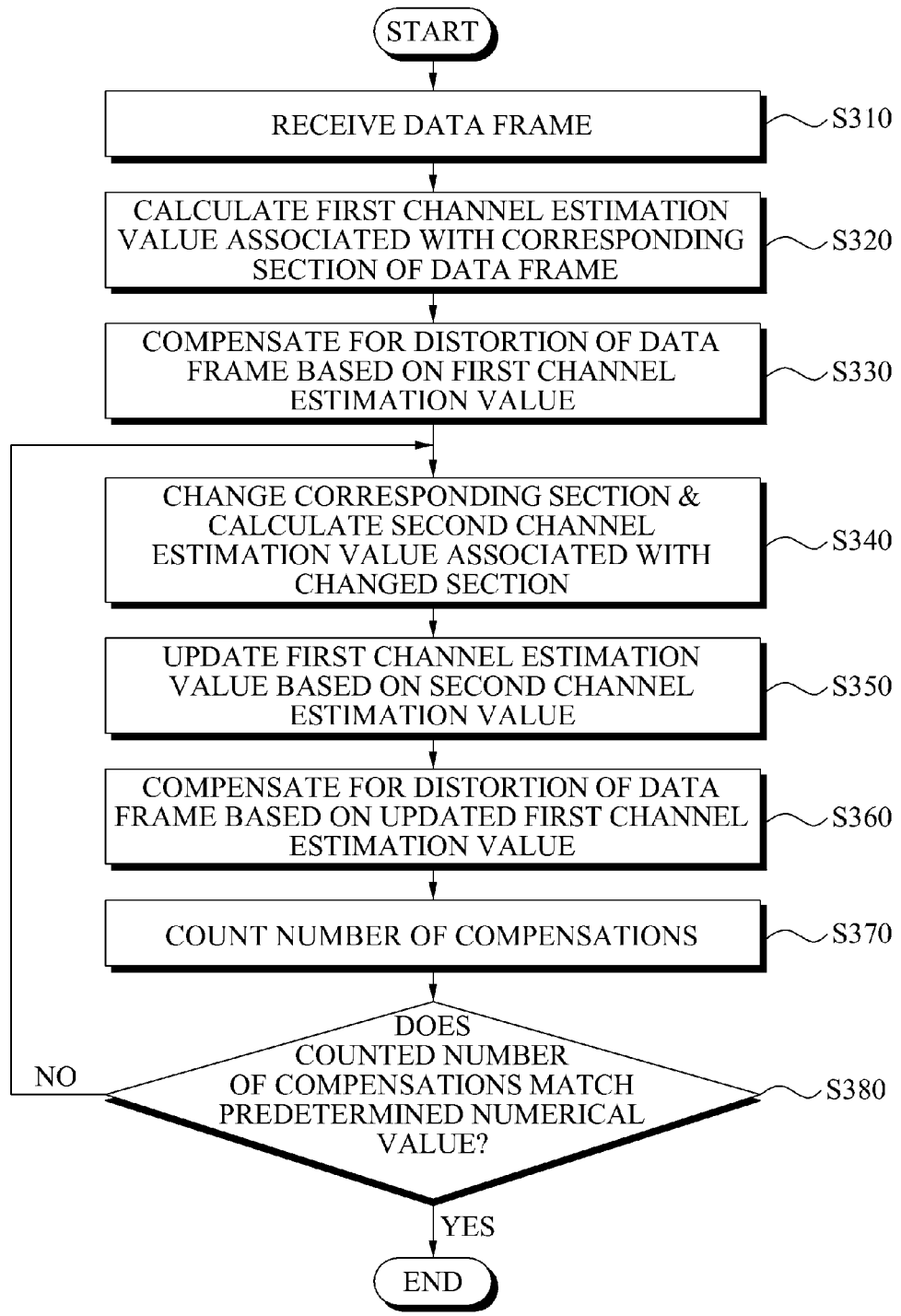
FIG. 3 is a flowchart illustrating a multistage channel estimation method according to an embodiment of the present invention.

FIG. 3 is a flowchart illustrating a multistage channel estimation method according to an embodiment of the present invention. The multistage channel estimation method may be performed by the multistage channel estimation apparatus 100 of FIG. 1.

Referring to FIGS. 1 and 3, in operation S310, the multistage channel estimation apparatus 100 may receive a data frame from a predetermined communication device, for example, an RFID tag, of a wireless communication system.

In operation S320, the multistage channel estimation apparatus 100 may perform channel estimation for a corresponding section of the data frame. The multistage channel estimation apparatus 100 may calculate a first channel estimation value associated with the corresponding section of the data frame.

Specifically, the multistage channel estimation apparatus 100 may obtain information associated with a frequency and phase of the data frame before passing through a channel and measure a frequency and phase associated with a preamble section of the data stream. The multistage channel estimation apparatus 100 may compare the obtained frequency and phase with the measured frequency and phase, and calculate the first channel estimation value of the preamble section based on the comparison result.

In operation S330, the multistage channel estimation apparatus 100 may compensate for a distortion of the data frame based on the calculated first channel estimation value. Specifically, the multistage channel estimation apparatus 100 may accurately restore the data frame by compensating for the distortion of the data frame based on the calculated first channel estimation value.

In operation S340, the multistage channel estimation apparatus 100 may change the corresponding section and perform channel estimation for the changed section. The multistage channel estimation apparatus 100 may calculate a second channel estimation value associated with the changed section. The multistage channel estimation apparatus 100 may sum up the first channel estimation value and the calculated second channel estimation value, calculate a third channel estimation value, and correct the calculated third channel estimation value through averaging of the values.

The changed section may include any one of at least one bit unit in the data frame, a preamble, and a payload.

In operation S350, the multistage channel estimation apparatus 100 may update the first channel estimation value based on the calculated second channel estimation value. The multistage channel estimation apparatus 100 may update the corrected third channel estimation value with the first channel estimation value.

In operation S360, the multistage channel estimation apparatus 100 may compensate for the distortion of the data frame based on the first channel estimation value and count a number of compensations. The multistage channel estimation apparatus 100 may compensate for a distortion of the measured frequency and phase associated with the preamble section based on the updated first channel estimation value. Also, the multistage channel estimation apparatus 100 may compensate for a distortion of a frequency associated with a payload of the data frame based on the updated first channel estimation value. The first channel estimation value may include the updated first channel estimation value.

In operation S370, the multistage channel estimation apparatus 100 may count a number of compensations. The multistage channel estimation apparatus 100 may count the number of compensations associated with the data frame that includes the preamble and the payload.

In operation S380, the multistage channel estimation apparatus 100 may determine whether the counted number of compensations matches a predetermined numerical value. When the counted number of compensations matches the numerical value, operation of the multistage channel estimation apparatus 100 is terminated.

Conversely, when the counted number of compensations does not match the numerical value, the multistage channel estimation apparatus 100 may return to operation S340. Specifically, the multistage channel estimation apparatus 100 may perform operations S340 through S380.

Figure 4:
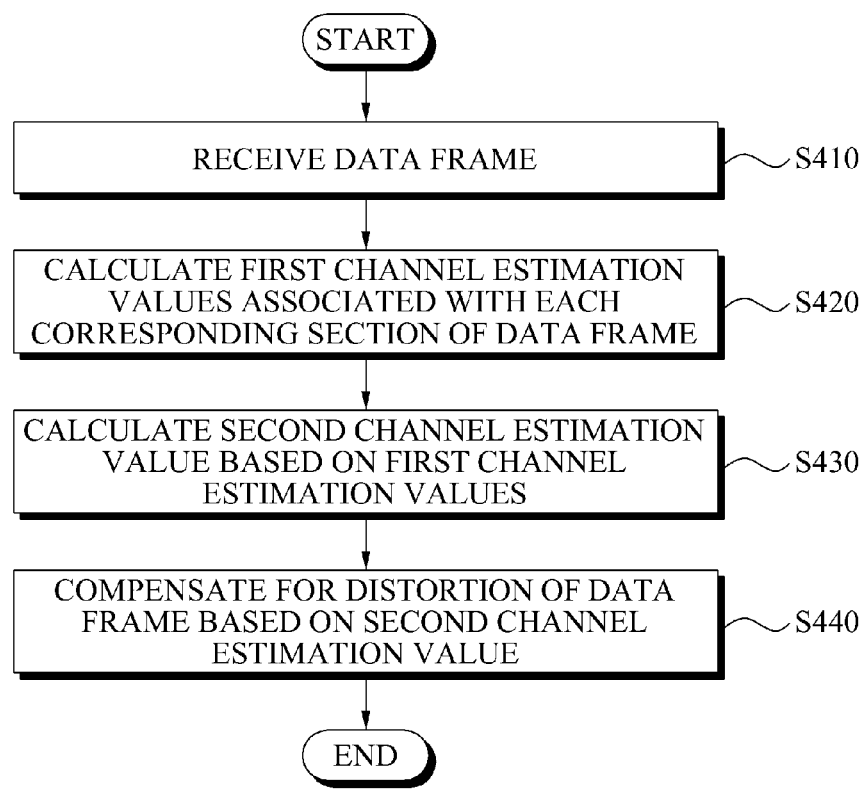
FIG. 4 is a flowchart illustrating a multistage channel estimation method according to another embodiment of the present invention.

FIG. 4 is a flowchart illustrating a multistage channel estimation method according to another embodiment of the present invention. The multistage channel estimation method may be performed by the multistage channel estimation apparatus 100 of FIG. 1.

Referring to FIGS. 1 and 4, in operation S410, the multistage channel estimation apparatus 100 may receive a data frame form a predetermined communication device, for example, an RFID tag of a wireless communication system.

In operation S420, the multistage channel estimation apparatus 100 may calculate first channel estimation values associated with each corresponding section of the data frame.

In operation S430, the multistage channel estimation apparatus 100 may calculate a second channel estimation value based on the calculated first channel estimation values. The multistage channel estimation apparatus 100 may sum up and correct the calculated first channel estimation values to thereby calculate the second channel estimation value.

Specifically, the multistage channel estimation apparatus 100 may calculate the second channel estimation value by summing up the calculated first channel estimation values and correcting the result of the summation through averaging of the calculated first channel estimation values.

In operation S440, the multistage channel estimation apparatus 100 may compensate for a distortion of the data frame based on the calculated second channel estimation value. The multistage channel estimation apparatus 100 may compensate for the distortion of the data frame based on the calculated second channel estimation value to thereby more accurately restore the data frame.

The exemplary embodiments of the present invention include computer-readable media including program instructions to implement various operations embodied by a computer. The media may also include, alone or in combination with the program instructions, data files, data structures, tables, and the like. The media and program instructions may be those specially designed and constructed for the purposes of the present invention, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Embodiments of the present invention may be applicable to when a wireless channel is only one and to a process of performing channel estimation for multiple channels and performing compensation and combination associated with each different channel. The compensation for change in phase may be applicable to the combined signal.

As described above, according to the present invention, it is possible to use a multistage channel estimation scheme of automatically estimating a distorted signal of a frequency and phase for each section along a distribution channel in a process of receiving a signal transmitted via a wireless channel, that is, a data frame and thereby stably obtain and estimate a frequency of the data frame.

Also, according to the present invention, it is possible to stably obtain and estimate a frequency of a data frame and thereby more accurately restore the data frame.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A multistage channel estimation method comprising:
    receiving a data frame to compensate for a distortion of the data frame based on a first channel estimation value associated with a corresponding section of the data frame;
    changing the corresponding section to calculate a second channel estimation value associated with the changed section;
    updating the first channel estimation value based on the calculated second channel estimation value;
    compensating for the distortion of the data frame based on the updated first channel estimation value to count a number of compensations; and
    repeating the changing, the updating, and the compensating, when the counted number of compensations does not match a predetermined numerical value,
    wherein a channel estimation is performed in a preamble section of the data frame,
    wherein the updating comprises:
    summing up the first channel estimation value and the second channel estimation value to calculate a third channel estimation value; and
    correcting the calculated third channel estimation value to update the first channel estimation value.

2. The method of claim 1, wherein the updating the first channel estimation value comprises:
    correcting the calculated third channel estimation value; and
    updating the corrected third channel estimation value with the first channel estimation value.

3. The method of claim 1, wherein the compensating comprises:
    obtaining information associated with a frequency and phase of the data frame before passing through a channel;
    measuring a frequency and phase associated with the preamble section of the data frame as the corresponding section;
    comparing the obtained frequency and phase with the measured frequency and phase;
    calculating the first channel estimation value of the preamble section based on the comparison result; and
    compensating for the distortion of the data frame based on the calculated first channel estimation value.

4. The method of claim 3, wherein the compensating comprises:

compensating for a distortion of the measured frequency and phase associated with the preamble section based on the updated first channel estimation value; and compensating for a distortion of a frequency associated with a payload of the data frame based on the updated first channel estimation value.

5. The method of claim 1, wherein the changed section includes any one of at least one bit unit in the data frame, a preamble, and a payload.

6. A multistage channel estimation apparatus comprising:
a receiver to receive a data frame;
a channel estimator to calculate a first channel estimation value associated with a corresponding section of the data frame, change the corresponding section, calculate a second channel estimation value associated with the changed section, and update the first channel estimation value based on the calculated second channel estimation value; and
a compensator to compensate for a distortion of the data frame based on the first channel estimation value, and to count a number of compensations,
wherein, when the counted number of compensations does not match a predetermined numerical value, the channel estimator and the compensator repeat the above operation until the counted number of compensations reaches the predetermined numerical value,
wherein a channel estimation is performed in a preamble section of the data frame,
wherein the channel estimator sums up the first channel estimation value and the calculated second channel estimation value to calculate a third channel estimation value, and corrects the calculated third channel estimation value to update the first channel estimation value.

7. The apparatus of claim 6, wherein the channel estimator corrects the calculated third channel estimation value, and updates the corrected third channel estimation value with the first channel estimation value.

8. The apparatus of claim 6, wherein:
the channel estimator obtains information associated with a frequency and phase of the data frame before passing through a channel, measures a frequency and phase associated with a preamble section of the data frame as the corresponding section, compares the obtained frequency and phase with the measured frequency and phase, and calculates the first channel estimation value of the preamble section based on the comparison result, and
the compensator compensates for the distortion of the data frame based on the calculated first channel estimation value.

9. The apparatus of claim 8, wherein the compensator compensates for a distortion of the measured frequency and phase associated with the preamble section based on the updated first channel estimation value, and compensates for a distortion of a frequency associated with a payload of the data frame based on the updated first channel estimation value.

10. The apparatus of claim 6, wherein the changed section includes any one of at least one bit unit in the data frame, a preamble, and a payload.

* * * * *